US012716356B2

(12) United States Patent
Andersen et al.

(10) Patent No.: US 12,716,356 B2
(45) Date of Patent: Aug. 25, 2026

(54) HYDRAULIC AXIAL PISTON MACHINE

(71) Applicant: Danfoss A/S, Nordborg (DK)

(72) Inventors: Stig Kildegaard Andersen, Krusaa (DK); Frank Holm Iversen, Padborg (DK)

(73) Assignee: DANFOSS A/S, Nordborg (DK)

( * ) Notice: Subject to any disclaimer, the term of this patent is extended or adjusted under 35 U.S.C. 154(b) by 577 days.

(21) Appl. No.: 17/039,110

(22) Filed: Sep. 30, 2020

(65) Prior Publication Data

US 2021/0189878 A1 Jun. 24, 2021

(30) Foreign Application Priority Data

Dec. 19, 2019 (DE) ......................... 102019135083.2

(51) Int. Cl.

*F01B 3/00* (2006.01)
*F03C 1/06* (2006.01)
*F04B 1/2007* (2020.01)
*F04B 1/2021* (2020.01)
*F04B 1/2042* (2020.01)

(52) U.S. Cl.

CPC .......... *F01B 3/0047* (2013.01); *F01B 3/0041* (2013.01); *F03C 1/0636* (2013.01); *F03C 1/0647* (2013.01); *F04B 1/2007* (2013.01); *F04B 1/2021* (2013.01); *F04B 1/2042* (2013.01)

(58) Field of Classification Search

CPC ...... F01B 3/004; F01B 3/0041; F01B 3/0047; F01B 3/0647; F03C 1/0636; F03C 1/0647; F04B 1/2021; F04B 1/2042; F04B 1/2007; F16F 1/12; F16F 1/122

USPC .......................................................... 267/179

See application file for complete search history.

(56) References Cited

U.S. PATENT DOCUMENTS

| | | | | |
|---|---|---|---|---|
| 2,737,666 | A * | 3/1956 | Herider | F16F 1/122 5/264.1 |
| 3,037,489 | A | 6/1962 | Douglas | |
| 3,249,061 | A | 5/1966 | Ricketts | |
| 3,295,460 | A | 1/1967 | Thompson | |

(Continued)

FOREIGN PATENT DOCUMENTS

| | | | |
|---|---|---|---|
| CN | 102996386 | A | 3/2013 |
| CN | 103429936 | A | 12/2013 |

(Continued)

OTHER PUBLICATIONS

Breuer, "DE102013205263A_MT.pdf" (Machine Translation) (Year: 2014).*

(Continued)

*Primary Examiner* — Kenneth J Hansen

(74) *Attorney, Agent, or Firm* — McCormick, Paulding & Huber PLLC

(57) ABSTRACT

A hydraulic axial piston machine (1) is described, the machine comprising a housing, a cylinder block (2) rotatably mounted in the housing about an axis or rotation (7) and having at least one cylinder (3), and a valve arrangement (4) between the cylinder block (2) and the housing, the valve arrangement having a first part (4) rotating with the cylinder block (2) and a second part mounted stationary with respect to the housing. Such a machine should have a high efficiency. To this end the first part (4) comprises an elastically deformable spring section (9).

19 Claims, 2 Drawing Sheets

(56) References Cited

U.S. PATENT DOCUMENTS

| | | | | |
|---|---|---|---|---|
| 3,362,342 | A | 1/1968 | Flint et al. | |
| 3,523,678 | A | 8/1970 | Wright | |
| 3,756,279 | A | 9/1973 | Widmaier | |
| 3,818,803 | A | 6/1974 | Scott et al. | |
| 4,481,867 | A | 11/1984 | Nagase et al. | |
| 5,022,310 | A | 6/1991 | Stewart et al. | |
| 5,279,205 | A | 1/1994 | Carlson, Jr. et al. | |
| 5,316,451 | A | 5/1994 | Hore et al. | |
| 5,540,139 | A | 7/1996 | Martensen et al. | |
| 5,653,049 | A * | 8/1997 | Motoda | D06F 83/00 38/66 |
| 5,752,428 | A | 5/1998 | Jepsen | |
| 10,094,364 | B2 | 10/2018 | MacHarg | |
| 2004/0216601 | A1 | 11/2004 | Matsumoto et al. | |
| 2005/0089410 | A1 | 4/2005 | Matsumoto et al. | |
| 2007/0022873 | A1 | 2/2007 | Sund et al. | |
| 2012/0192954 | A1 | 8/2012 | Jorgenson | |
| 2015/0204448 | A1 | 7/2015 | McEvoy et al. | |
| 2016/0273525 | A1 | 9/2016 | Criville | |
| 2016/0281505 | A1 | 9/2016 | MacHarg | |
| 2018/0272821 | A1 * | 9/2018 | Meier | F16F 1/122 |
| 2018/0328350 | A1 | 11/2018 | Matsuo et al. | |
| 2021/0190066 | A1 | 6/2021 | Andersen et al. | |

FOREIGN PATENT DOCUMENTS

| | | | | |
|---|---|---|---|---|
| CN | 105683568 | A | 6/2016 | |
| CN | 106837771 | A | 6/2017 | |
| DE | 1 006 262 | B | 4/1957 | |
| DE | 2 049 003 | A1 | 4/1972 | |
| DE | 16 53 540 | B1 | 1/1976 | |
| DE | 3213031 | A1 * | 10/1983 | B60G 11/16 |
| DE | 42 94 699 | T1 | 1/1994 | |
| DE | 43 41 850 | A1 | 6/1995 | |
| DE | 195 25 852 | A1 | 1/1997 | |
| DE | 10 2008 060 067 | A1 | 6/2010 | |
| DE | 102 23 844 | B4 | 4/2013 | |
| DE | 10 2013 205 263 | A1 | 10/2014 | |
| DE | 102014225497 | A1 | 6/2015 | |
| EP | 0 708 242 | A1 | 4/1996 | |
| EP | 1 705 372 | A1 | 9/2006 | |
| EP | 1 748 187 | A2 | 1/2007 | |
| FR | 1 233 394 | A | 10/1960 | |
| FR | 1482992 | A | 6/1967 | |
| FR | 2002009 | A1 | 10/1969 | |
| JP | 2004270524 | A | 9/2004 | |
| JP | 2007327433 | A | 12/2007 | |
| JP | 58128477 | B2 | 11/2015 | |
| WO | 93/14298 | A1 | 7/1993 | |

OTHER PUBLICATIONS

Delam, Device for Securing the Spring Ends of Steel Helical Springs . . . , Machine Trans. (DE3213031MT.pdf), Oct. 1983 (Year: 1983).*

Search Report for Great Britain Patent Application No. GB2019705.9 dated May 28, 2021.

Search Report for Great Britain Patent Application No. GB2019704.2 dated May 25, 2021.

* cited by examiner

HYDRAULIC AXIAL PISTON MACHINE

CROSS-REFERENCE TO RELATED APPLICATION

This application claims foreign priority benefits under 35 U.S.C. § 119 to German Patent Application No. 102019135083.2 filed on Dec. 19, 2019, the content of which is hereby incorporated by reference in its entirety.

TECHNICAL FIELD

The present invention relates to a hydraulic axial piston machine comprising a housing, a cylinder block rotatably mounted in the housing about an axis of rotation and having at least one cylinder, and a valve arrangement between the cylinder block and the housing, the valve arrangement having a first part rotating with the cylinder block and a second part mounted stationary with respect to the housing.

BACKGROUND

Such an axial piston machine is known, for example, from US 100 94 364 B2.

In an axial piston machine the cylinder block comprises one or more cylinders wherein a piston is arranged in each cylinder. Each piston is connected to a piston shoe which rests against a swash plate and is held against the swash plate by means of retainer means. In some kinds of such axial piston machines, the other end of these springs pushes onto the cylinder block which in turn pushes onto the first or rotating part of the valve arrangement.

In any case, a certain force is necessary to push the rotating part of the valve arrangement against the stationary part. When this is achieved by transferring a force from the cylinder block onto the rotating part, it is preferable that this transfer of force occurs at the same location in the valve arrangement in different machines to avoid performance variations between individual machines. Furthermore, it is preferable that the force is well distributed and has a centroid close to the axis of rotation to avoid a localised peak in contact pressure and wear that may occur if the force is transferred in a localised contact.

SUMMARY

The object underlying the invention is to have an axial piston machine having a good efficiency.

This object is solved with a hydraulic axial piston machine as described at the outset in that the first part comprises an elastically deformable spring section.

The spring section is formed in one piece with the first part so that only the first part needs to be handled during the assembly of the machine. No further spring parts are necessary in this place. When the spring section is formed at the first or rotating part, tolerances can be kept small and the first parts of a number of different machines of the same kind can be made identical to a rather large extent.

In an embodiment of the invention the spring section is arranged around the axis of rotation. This means that the force produced by the spring means can be distributed around the axis of rotation.

In an embodiment of the invention the spring section is deformable in axial direction only. Thus, there is no deformation in radial direction and the position of a contact between the spring section and the cylinder block is maintained. The risk of wear can be kept small.

In an embodiment of the invention the transfer of force from the cylinder block to the first part via the spring section is symmetrical with respect to the axis of rotation. The spring section will receive the force from the cylinder block. The spring section will be deformed slightly in the axial direction due to the force. The first part is designed to compensate axial misalignment and will, therefore, align with the second part of the valve arrangement and not with the end face of the cylinder block. Therefore, the axial deformation of the spring section will be slightly asymmetric relative to the axis of rotation. If the axial deformation of the spring due to the force from the cylinder block is larger than the asymmetry of the axial deformation due to misalignment, the centroid of the contact force will be near the axis of rotation and the transfer of force from the spring section to the rest of the first part of the valve arrangement will be nearly symmetric around the axis of rotation.

In an embodiment of the invention the spring section is machined out of the first part. The machining can be made, for example, by turning. This is a simple way to make the spring section in one part with the remainder of the first part.

In an embodiment of the invention the spring section comprises a rim surrounding the axis of rotation and contacting the cylinder block. The rim can slightly be moved in axial direction in relation to the remainder of the first part.

In an embodiment of the invention the rim has a thickened section at the end contacting the cylinder block. The thickened section provides a larger contact phase between the cylinder block and the spring section, thus lowering the contact pressure and thereby the risk of wear between the cylinder block and the thickened section.

In an embodiment of the invention the rim is connected to a radially outer part of the first part by means of a hinge section, wherein the hinge section has a thickness which is smaller than a thickness of the first part. The spring section is deformed basically in the hinge section.

In an embodiment of the invention the rim has a largest thickness which is larger than the thickness of the hinge section. This is a simple way to concentrate the deformation of the spring section in the hinge section.

In an embodiment of the invention the hinge section comprises a wavelike form. The wavelike form allows a deformation of the hinge section in which the rim is moved basically parallel to the axial direction.

In an embodiment of the invention in a sectional view the hinge section comprises two concave arc like portions which are connected by a convex arc like portion. The concave arc like portions have a center of curvature on the side of the cylinder block and the convex arc like portion has a center of curvature on the side of the second part. The spring section is designed so that the axial deformation of the spring section will not cause significant relative motion between the cylinder block and the rim. This will minimize the wear in the interface between the cylinder block and the rim.

In an embodiment of the invention the convex arc like portion is more strongly curved than at least one of the concave arc like portions. This contributes to the desired deformation of the spring section.

In an embodiment of the invention the spring section rests against a protrusion of the cylinder block. Thus, it is not necessary that the spring section protrudes out of the first part. Accordingly, during machining of the first part, less material has to be removed.

BRIEF DESCRIPTION OF THE DRAWINGS

The invention will now be described in more detail with reference to the drawing, in which.

DETAILED DESCRIPTION

Figure 1:
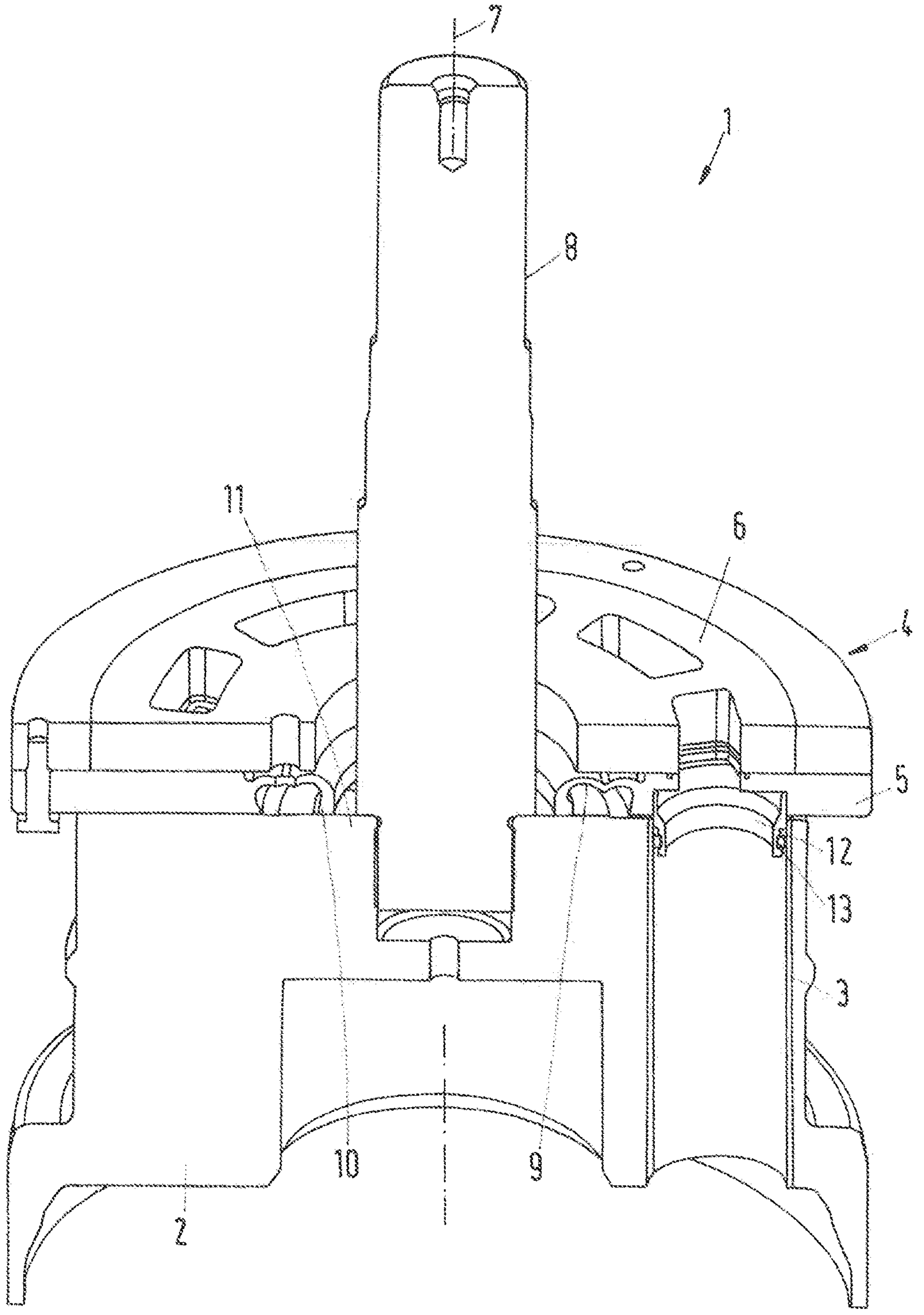
FIG. 1 shows a schematic illustration of parts of an axial piston machine.

FIG. 1 schematically shows parts of an axial piston machine 1, namely a cylinder block 2 having a cylinder 3 and a first part 4 of a valve arrangement. The first part 4 comprises a support plate 5 and a wear plate 6. The wear plate 6 can be made of a ceramic material, while the support plate 5 is made of metal. The housing and the second part are omitted to simplify the illustration.

In such a hydraulic axial piston machine a piston (not shown) is arranged in the cylinder 3. During operation the piston moves up and down in the cylinder 3 and varies the free volume of the cylinder 3. The piston is connected to a piston shoe which is held against a swash plate by means of retainer means.

When the axial piston machine 1 is operated as a pump, a shaft 8 which is connected to the cylinder block 2 is rotated. A piston moving away from the valve arrangement sucks liquid into the cylinder 3 and a piston moving towards the valve arrangement displaces the liquid under an elevated pressure to the outside.

When the hydraulic axial piston machine is operated as motor, liquid is pushed into the cylinder pressing the piston away from the valve arrangement. This movement of the piston together with the effect of the swash plate creates a torque rotating the cylinder block 2 as it is known in the art.

In order to control the flow of the liquid the valve arrangement is provided.

The first part 4 of the valve arrangement must be loaded against the second part of the valve arrangement with a certain force in order to prevent leakages.

In the present case such force is produced by the springs of a retainer system holding the piston shoes against a swash plate. These springs are usually compressed by several mm. This large compression makes the force insensitive to production tolerances.

The first part 4, more precisely the support plate 5, comprises a spring section 9. The spring section 9 comprises a rim 10 surrounding the shaft 8 and the axis of rotation 7. The rim 10 contacts the cylinder block 2. To this end the cylinder block 2 is provided with a protrusion 11. The height of the protrusion 11 can be quite small. The height should be dimensioned that the spring section 9 is sufficiently deformed before the cylinder block 2 contacts the first part 4 radially out of the spring section 9.

Sockets 12 or thrust pads connect each cylinder 3 to the first part 5. Each socket 12 is sealed in the cylinder 3 by means of an O-ring 13.

Figure 2:
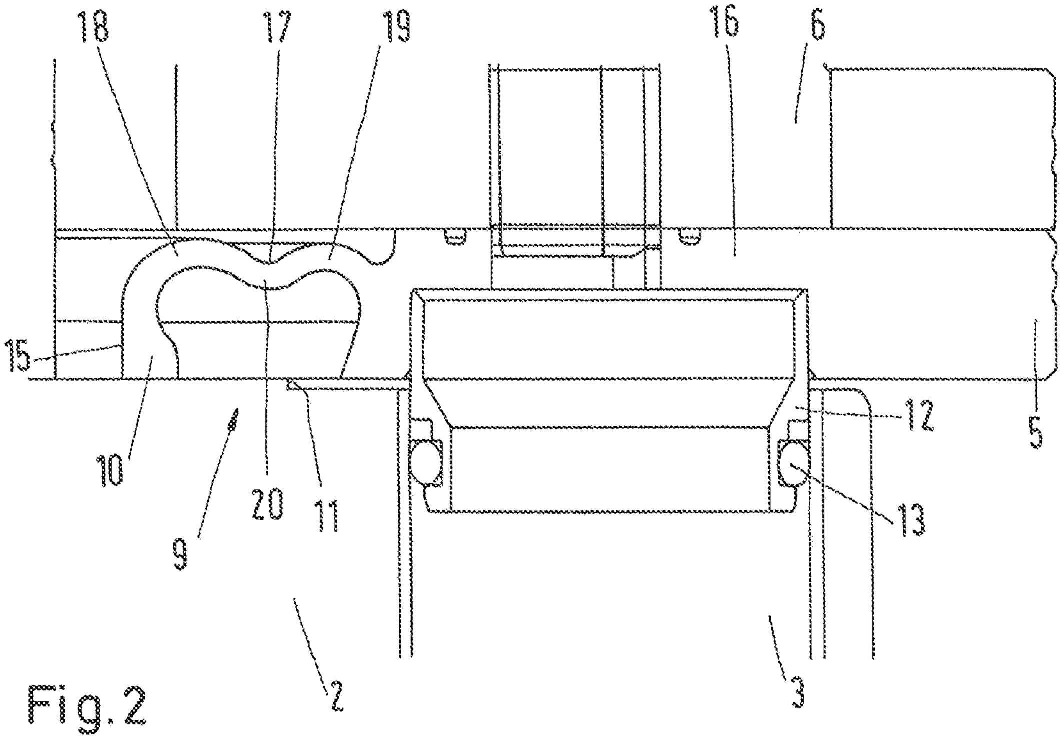
FIG. 2 shows a detail of FIG. 1 in a larger view.

FIG. 2 shows the spring section 9 in more detail. The same elements are denoted with the same reference numerals as in FIG. 1.

The rim 10 has a thickened section 15 at the end contacting the cylinder block 2. The rim is connected to a radially outer part 16 of the support plate 5 by means of a hinge section 17. The hinge section 17 has a thickness which is smaller than a thickness of the support plate 5. The support plate 5 has basically a constant thickness out of the spring section 9.

The rim 10 has a largest thickness which is larger than the thickness of the hinge section 17. This means that the spring section 9 is deformed mainly in the hinge section 17 with the consequence that during a deformation of the spring section 9 the rim 10 is moved only in axial direction and not displaced in a radial direction relative to the axis of rotation 7.

The hinge section 17 comprises a wavelike form of two concave arc like portions 18, 19 which are connected by a convex arc like portion 20. The center of curvature of the concave arc like portions 18, 19 is on the side of the cylinder block 2 whereas the center of curvature of the convex arc like portion 20 is on the side of the second part. The convex arc like portion 20 is more strongly curved than at least one of the concave arc like portions 18, 19, i.e. it has a smaller radius of curvature.

Figure 3:
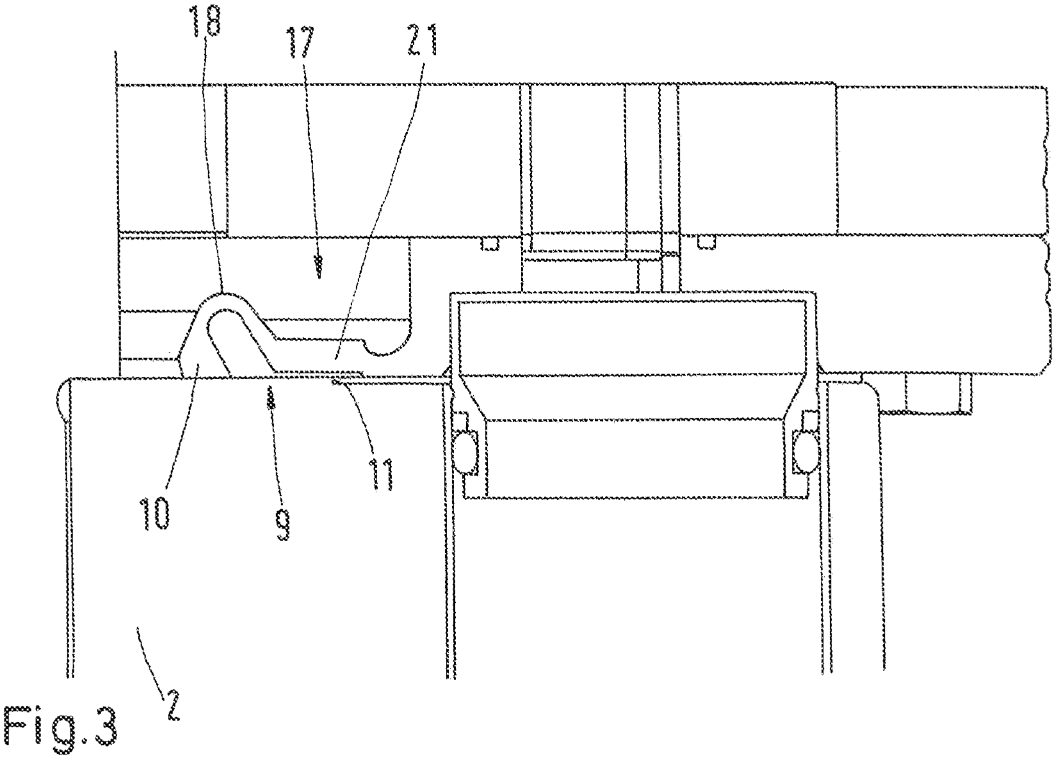
FIG. 3 shows a second embodiment of the detail of FIG. 2

FIG. 3 shows a slightly different form of the spring section 9. The same and like parts as in FIGS. 1 and 2 are denoted with the same reference numerals.

In this embodiment the spring section 9 comprises likewise a rim 10. However, the hinge section 17 is slightly different. It comprises only one concave arc like portion which is connected to the radial outer part of the support plate 5 by means of a straight section 21.

With the spring section 9 shown in FIG. 2 or 3 a slightly compliant/flexible contact between the cylinder block 2 and the first or rotating part 4 of the valve arrangement is achieved that distributes the contact force between the cylinder block 2 and the first part 4 of the valve arrangement nearly symmetrically around the axis of rotation 7 of the axial piston machine.

The spring section 9 is formed by machining, for example turning, of the support plate 5 of the first or rotating part 4 of the valve arrangement. The spring section 9 is symmetric relative to the axis of rotation 7.

One side of the spring section 9 will receive the force from the cylinder block 2. This is the rim 10. The spring section 9 will be deformed slightly in the axial direction due to the force. The rotating or first part 4 of the valve arrangement is designed to compensate axial misalignment and will, therefore, align with the second or stationary part of the valve arrangement and not with the end face of the cylinder block 2. Therefore, the axial deformation of the spring section 9 will be slightly asymmetric relative to the axis of rotation 7. If the axial deformation of the spring section 9 due to the force from the cylinder block 2 is larger than the asymmetry of the axial deformation due to misalignment, the centroid of the contact force will be near the axis or rotation 7 and the transfer of force from the spring section to the rest of the first or rotating part 4 of the valve arrangement will be nearly symmetric around an axis or rotation 7.

In addition to contributing to high efficiency, less wear, and less performance deviations between individual machines, the embodiment shown has the following advantages: the spring section 9 can be designed so that the axial deformation of the spring section 9 will not cause significant relative motion between the cylinder block 2 and the rim 10. This is in particular true for the embodiment shown in FIG. 2. This will minimize the wear in the interface between the cylinder block 2 and the spring section 9 compared to, for instance, placing a disk spring between the cylinder block 2 and the rotating part 4 of the valve arrangement because a disk spring will also deform radially when it deforms axially.

Furthermore, no extra components are required to be added to a machine. Hence no extra component will need to be produced and kept on stock, there is no extra component that can be forgotten or mounted incorrectly during assembly or service.

Because the spring section 9 is machined from already available material the added cost is minimized.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic axial piston machine comprising a housing, a cylinder block rotatably mounted in the housing about an axis of rotation and having at least one cylinder, and a valve arrangement between the cylinder block and the housing, the valve arrangement having a first part rotating with the cylinder block, characterized in that the first part comprises an elastically deformable spring section, wherein the spring section and the first part are one piece, and wherein the spring section is machined out of the first part.

2. The machine according to claim 1, wherein the spring section is arranged around the axis of rotation.

3. The machine according to claim 2, wherein the spring section is deformable in axial direction only.

4. The machine according to claim 2, wherein a transfer of force from the cylinder block to the first part via the spring section is symmetrical with respect to the axis of rotation.

5. The machine according to claim 2, wherein the spring section comprises a rim surrounding the axis of rotation and contacting the cylinder block.

6. The machine according to claim 1, wherein the spring section is deformable in axial direction only.

7. The machine according to claim 6, wherein a transfer of force from the cylinder block to the first part via the spring section is symmetrical with respect to the axis of rotation.

8. The machine according to claim 1, wherein a transfer of force from the cylinder block to the first part via the spring section is symmetrical with respect to the axis of rotation.

9. The machine according to claim 1, wherein the spring section comprises a rim surrounding the axis of rotation and contacting the cylinder block.

10. The machine according to claim 9, wherein the rim has a thickened section at an end contacting the cylinder block.

11. The machine according to claim 9, wherein the rim is connected to a radially outer part of the first part by means of a hinge section, wherein the hinge section has a thickness which is smaller than a thickness of the radially outer part.

12. The machine according to claim 11, wherein the rim has a largest thickness which is larger than the largest thickness of the hinge section.

13. The machine according to claim 11, wherein the hinge section comprises a wave like form.

14. The machine according to claim 13, wherein in a sectional view the hinge section comprises two concave arc like portions which are connected by a convex arc like portion.

15. The machine according to claim 14, wherein the convex arc like portion is more strongly curved than at least one of the concave arc like portions.

16. The machine according to claim 1, wherein the spring section rests against a protrusion of the cylinder block.

17. The machine according to claim 1, wherein the spring section forces the first part away from the cylinder block.

18. A hydraulic axial piston machine comprising a housing, a cylinder block rotatably mounted in the housing about an axis of rotation and having at least one cylinder, and a valve arrangement between the cylinder block and the housing, the valve arrangement having a first part rotating with the cylinder block, wherein the first part comprises a support plate and an elastically deformable spring section, wherein the spring section lies in the plane of the support plate, and wherein the spring section is machined out of the first part.

19. A hydraulic axial piston machine comprising a housing, a cylinder block rotatably mounted in the housing about an axis of rotation and having at least one cylinder, and a valve arrangement between the cylinder block and the housing, the valve arrangement having a first part rotating with the cylinder block, wherein the first part comprises an elastically deformable spring section, wherein the spring section and the support plate are one piece, wherein the spring section contacts an uppermost surface of the cylinder block, and wherein the spring section is machined out of the first part.

* * * * *